Sept. 1, 1970  H. S. BRYANT, JR  3,526,658

STEAM SUBLIMATION OF TEREPHTHALIC ACID

Filed May 27, 1968  2 Sheets-Sheet 1

*FIG. 1*

INVENTOR.
HOWARD S. BRYANT, JR.

BY

*James F. Snowden*

ATTORNEY

United States Patent Office 3,526,658
Patented Sept. 1, 1970

3,526,658
STEAM SUBLIMATION OF TEREPHTHALIC ACID
Howard S. Bryant, Jr., New York, N.Y., assignor to Mobil Oil Corporation, a corporation of New York
Continuation-in-part of application Ser. No. 418,482, Dec. 15, 1964. This application May 27, 1968, Ser. No. 736,925
Int. Cl. C07c 51/42
U.S. Cl. 260—525　　　　　　　　　　　　16 Claims

ABSTRACT OF THE DISCLOSURE

Purifying crude terephthalic acid containing more volatile contaminants (e.g., p-carboxybenzaldehyde) and ash in a sublimation process involving charging fine particles of the crude acid in nontacky condition into a conduit through which an entrainer gas containing superheated steam is flowing at transport velocity, further heating the dilute phase suspension of soild particles in the entrainer (e.g., 10–30 mols of entrainer per mol of terephthalic acid) while passing through a vaporizer coil heated to carefully controlled temperatures to completely vaporize the acid with the steam serving to inhibit anhydride formation, separating ash from the hot carrier stream in a filter and fractionally condensing the terephthalic acid in the solid state while volatile contaminants are retained in the vapor phase by direct cooling with steam and water coolants in one or more condensers having their walls heated above the dew point of the adjacent vapor stream to eliminate condensation on the walls. Superheated steam is injected around the vapor inlet of the condenser to eliminate terephthalic acid deposits there as well as to minimize shock cooling and to promote better mixing of the condensing vapor and cooling medium.

CROSS-REFERENCE TO RELATED APPLICATIONS

This application is a continuation-in-part of my application Ser. No. 418,482 filed Dec. 15, 1964, which is now abandoned.

BACKGROUND OF THE INVENTION

Field of the invention

The present invention relates to the sublimation of impure terephthalic acid while entrained or suspended in a gaseous carrier stream containing steam including the condensation of a highly purified product therefrom while most of the more volatile impurities associated therewith are withdrawn along with the steam for later recovery along with uncondensed terephthalic acid.

Description of the prior art

Terephthalic acid is of growing commercial importance, particularly as a raw material for the manufacture of polyethylene-terephthalate as the demand for fibers, tapes and films of this polymer is continually increasing. In the manufacture of such articles, a resin of high purity is required and this is reflected in the specifications for the terephthalic acid utilized. Accordingly, the impurities in terephthalic acid are usually measured in parts per million by weight (p.p.m.); and in the case of material intended for use in making the film base of magnetic tapes, the content of metal compounds (ash) should not exceed a few parts p.p.m.

Terephthalic acid can be economically produced by the partial oxidation of p-xylene but the crude product contains a number of impurities, most of which are incomplete oxidation products and more volatile than the product terephthalic acid. Of these, the chief and most troublesome is p-carboxybenzaldehyde (p-aldehydobenzoic acid) although p-toluic acid and terephthalic aldehyde are also usually present in lesser amounts.

Terephthalic acid is now purified by formation of a water-soluble alkali salt such as diammonium or disodium terephthalate, contacting of the aqueous solution with activated carbon for removal of incomplete oxidation products and metals, followed by regeneration of the terephthalic acid by acid neutralization. This procedure has the advantage of removing incomplete oxidation products and heavy metals to a low level. It has the disadvantage of: (1) high raw materials costs (acid, alkali and carbon), (2) the introduction of other impurities not originally present, such as sodium, nitrogen and sulfate, nitrate or phosphate groups and (3) the necessity for sale or regeneration of a by-product inorganic salt. Various means of applying this purification method are described in U.S. Pats. Nos. 3,080,-420, 3,080,421, and 3,095,445.

Although sublimation is in theory simpler, cheaper and avoids the introduction of new impurities by reason of the wholly physical nature of the processing, the practical operating difficulties have apparently precluded the commercial use of sublimation purification heretofore. For example, although terephthalic acid is a truly sublimable solid which does not pass through a liquid stage during either vaporization or condensation; nevertheless particles thereof are relatively tacky at temperatures above about 450° F. and these hot particles tend to stick together and to the walls of conventional condensation apparatus, hoppers, cyclones, transfer lines, etc. and thus obstruct such equipment. Also when a significant amount of p-carboxybenzaldehyde is present, the problem is intensified since the volatility of this material is not greatly different from that of terephthalic acid. This impurity has a tendency to condense as a film of liquid on condensing terephthalic acid particles thereby promoting the agglomeration of the solid terephthalic acid particles into rather sticky masses. While the flow characteristics of particulate solids generally improve with an increase in particle size, this is not true of all terephthalic acid sublimates as these frequently are large particles shaped like needles or rods with extremely poor flow characteristics. This type of particle is less readily slurried with ethylene glycol in the manufacture of resins than the preferred globular particles of terephthalic acid.

Proposals have also been made for purifying crude terephthalic acid by sublimation including the passage of gaseous carrier agents through fluidized beds of the crude material to entrain vaporized material therein, as exemplified by those in Maclean Pat. No. 2,923,736. However, such methods do not appear to have been used on a commercial scale, perhaps due to the difficulties which are encountered in subliming terephthalic acid, particularly in a dense fluidized bed.

Also, Livingston Pat. No. 1,987,301 describes a process for vaporizing preheated salicylic acid or other volatilizable organic substances in a pulverizing mill by the passage through the mill of a stream of preheated air, carbon dioxide or flue gas as a subliming medium which has sufficient heat content to supply the heat required for "substantially instantaneous vaporization" of the suspended solid particles while avoiding substantial contact of solid particles with hot metal surfaces; then cyclones and a filter are employed for removing nonvolatile foreign matter from the vapor stream prior to apparently total condensation of the product by cooling the vapor in an undisclosed manner. However, this process is not suitable for purifying terephthalic acid on a large scale as the very high vaporization temperature and rather large latent heat of vaporization of this substance would require uneconomically large volumes of extremely hot gaseous subliming medium and oversize process equipment; also substantial anhydride formation from decomposition of the acid would be expected as well as a distinct likelihood of the mill being plugged by hot sticky terephthalic acid agglomerates.

In view of the increasing demand for highly purified terephthalic acid, there is a distinct need for an improved and commercially feasible process for the purification of it by the sublimation technique.

SUMMARY OF THE INVENTION

The present invention is a sublimation process for purifying terephthalic acid containing material of a more volatile nature which includes the steps of continually feeding finely divided solid particles of said impure terephthalic acid in a nontacky condition into a gaseous entrainer stream flowing at a velocity sufficient to substantially immediately entrain and transport substantially all of said particles, vaporizing said acid essentially while said acid is carried as a dilute suspension of solid particles in a gaseous carrier stream having a substantial steam content and comprising said entrainer stream and while indirectly heating said suspension to provide at least a substantial part of the heat required for vaporization, separating any remaining solid material from said carrier stream, thereafter cooling said carrier stream to condense at least a substantial proportion of the terephthalic acid vapor therein while retaining at least a major proportion of said more volatile material in the gaseous phase and separating said condensed terephthalic acid from said stream as a product of substantially improved purity.

Narrower aspects of the invention include the combination in the aforesaid process as one or more of such features as effecting condensation of the acid vapor by direct cooling with water in a fluid state (e.g., injecting coolant steam at a relatively low temperature), preferred steam concentrations during the actual vaporization of solid particles; maintaining the condenser walls above the dew point of the adjacent vapor stream; heating the vapor inlet of the condensers with superheated steam; subsequent total condensation of organic compounds which were not condensed in the initial fractional condensation as well as the preferred temperature ranges for vaporization, condensation and for introducing steam as a carrier and coolant.

Other features as well as objects and advantages of the invention will be apparent to those skilled in the art upon consideration of the detailed disclosure hereinafter.

DESCRIPTION OF SPECIFIC EMBODIMENTS

In the instant process, the terephthalic acid charge, either in the form of the crude product obtained from any suitable source, for example, directly from the partial oxidation of p-xylene, or after partial purification as illustrated by subsequent prolonged leaching of this crude product at high temperature, with acetic acid or another low molecular weight fatty acid, is mixed in nontacky finely divided particle form with flowing steam and sublimed in simple apparatus employing vaporizers and condensers. Stream velocities throughout the system are desirably maintained high enough to keep all particles of either crude terephthalic acid or the resulting sublimate or condensate from depositing on any surface of the equipment other than cyclones, filters or bag collectors. The carrier or entraining agent may be either saturated or superheated steam; however, nitrogen, flue gas or other inert carrier gases may be mixed therewith if so desired. Vaporization of the terephthalic acid may be effected entirely by the heat absorbed from a relatively hot carrier stream alone in theory, but this is not feasible in commercial operations as an extremely large volume of extremely hot carrier steam would be required to supply all of the unusually large heat input needed for the sublimation of this acid including not only the large amount of sensible heat for elevating the material to its very high vaporization temperature but also its latent heat of vaporization which is of the order of 360 B.t.u./lb. and thus relatively large for a solid substance; also a larger volume of gaseous carrier would require larger and more expensive processing equipment throughout the plant; hence the carrier stream usually provides some of the necessary heat but indirect heating is utilized, for example a vaporization coil in a conventional furnace, to supply much or practically all of the heat required for vaporization of the solid material suspended as a dilute phase in the steam-containing gaseous carrier.

In many instances, the resulting mixture of steam and terephthalic acid vapor is eventually passed through a cyclone separator or a fine, porous solid filter constructed of a heat resistant material for the removal of ash or other nonvolatile impurities. It is generally preferred to remove the extremely small quantity of ash which typically does not exceed a few hundred p.p.m. immediately before the final stage of primary condensation in a multistage sublimation process in order to also remove any scale which may be picked up in transit through the multistage system. In a process wherein the terephthalic acid is only sublimed once, the removal of ash from the vaporizer effluent may be carried out immediately after vaporization.

Fractional or partial condensation of a considerable part but usually not all of the terephthalic acid as the least volatile component in the vapor stream may be effected in a primary condenser. The latter is usually a simple pipe, tube, or enlarged cylindrical vessel with an unobstructed interior and provided with one or more coolant injectors along its length; but conduits of rectangular or other cross section may be used instead. Also, a plurality of condenser tubes disposed in parallel arrangement may be substituted for the single condenser pipe. One or more streams of coolant are introduced to provide controlled primary condensation, and superheated steam is desirably injected around the periphery of the vapor inlet to the condenser as the preferred means for maintaining it above the dew point of the carrier stream to prevent the deposition of solid terephthalic acid in the inlet. At least one aqueous fluid coolant in the form of a water spray or a stream of steam at a substantially lower temperature than the vapor laden carrier stream is injected into this condenser to bring the temperature of the entire flowing mixture below the dew point of the terephthalic acid therein. Superheated steam may also be admitted to moderate the cooling rate or to adjust the linear gas velocity to a value suitable for transporting condensed solids or to control the TPA:steam ratio to keep impurities in the gaseous phase. The mixture of vaporized material and cooling steam passes through a sufficient length of pipe or vessel to effect mixing and cooling to a temperature suitable for condensing a predetermined substantial proportion of the terephthalic acid vapor present. Any liquid water used as a coolant is completely vaporized and no steam is condensed during this operation.

At the time of introduction into the gaseous entrainer stream, the crude terephthalic acid charge is on a nontacky, finely divided state so that it is readily dispersible in the stream in the absence of any fluidizing agents; thus, substantially all of the acid particles are entrained and transported immediately as a suspension of solid particles in the entrained gas stream. In general, the finely divided acid is preferably charged at atmospheric or ambient temperatures as available from normal production and storage of the crude material, but it is also contemplated that it may be preheated to an elevated temperature for the purpose of reducing the subsequent heat inputs if this should prove to be advantageous in some instances. However, such preheating must be restricted to temperatures below the tackiness range of the crude acid.

At the time of entraining the finely divided charge, the gaseous entrainer may have little or no steam content, particularly if the entrainer is at a low or only moderately elvated temperature; also the suspended solids may be initially transported as a relatively concentrated or dense phase suspension provided that the entrainer stream is flowing at a transport velocity (i.e., a sufficient flow of entrainer to preclude any substantial deposition of terephthalic acid particles on the walls of the transfer line) as may be readily determined by simple experimentation. In such instances, steam or more steam is then added to the entrained suspension by the time it reaches the indirectly heated vaporization zone or pipe where much or all of the suspended vaporizable material in the flowing dilute phase suspension of solid particles of the crude acid in a gaseous carrier stream of substantial steam content is converted to the vapor state. In general, the aforesaid dilute phase suspension may be defined as a relatively uniform suspension of one mol of the crude acid particles in about five or more mols of the gaseous carrier stream. A steam content of at least about 30 mol percent should be present in the gaseous carrier at all times when the terephthalic acid is exposed to temperatures approaching or above the sublimation point as in the vaporization and condensation operations. For simplicity, it is usually preferred to retain the crude acid charge in the full amount of the gaseous carrier needed for vaporization with its full content of steam and thus form the dilute suspension initially rather than later.

In one embodiment of this primary condensation about half of the temperature drop typically results from dilution with the lower temperature steam and the other half by heat transfer outward through the condenser pipe wall. As the terephthalic acid condenses directly into the form of small solid particles, the linear gas velocity in the condenser should be maintained high enough to keep these particles in suspension and thus prevent the deposition of solids on the wall of the pipe, particularly in the case of horizontal pipe.

In a preferred embodiment, the condenser wall is maintained at temperatures above the dew point of the adjacent mixed stream and gas velocity is less important as any particles of condensate striking the wall tend to rebound or vaporize instead of building up deposits on the wall.

Condensed solids are separated from suspension in the cooled carrier stream by conventional equipment such as a cyclone separator, bag collector or filter. This terephthalic acid sublimate is of substantially improved purity since it has a much lower content of the more volatile substances as most of the latter are carried out of the separator in the gaseous phase, and it may also be essentially free of nonvolatile impurities. Where a product of even higher purity is sought, as for example, one with a total content of impurities amounting to about 25 p.p.m. or less, the initial terephthalic acid sublimate may be resublimed one or more times under generally similar conditions in the same type of apparatus. Similar percentage reductions in the content of volatile impurities are obtainable in each sublimation stage. It is also contemplated that other methods for the purification of terephthalic acid may be employed either sequentially, or simultaneously in the case of certain techniques, in conjunction with the instant sublimation process.

The gaseous stream leaving the primary condensation separator contains all of the steam or water introduced both as a carrier agent and as a coolant along with a substantial content of uncondensed terephthalic acid and most of the more volatile impurities associated therewith. In a secondary condenser which may employ a single line of pipe or parallel piping or a vessel of large cross section, a spray of water may be introduced into that gaseous stream at a carefully controlled rate which is regulated to provide sufficient cooling of the mixed stream to condense much of the terephthalic acid remaining therein without condensing any steam in an operation in which the cooling water is completely vaporized. The solids condensed in this secondary condenser are recovered by separation from the gaseous phase in conventional equipment at a temperature usually about midway between the separation temperatures utilized in the primary and tertiary condensations. Tertiary condensation is suitably effected in the same way as in the secondary condenser except that the rate of introducing cooling water is desirably set as high as is feasible to condense substantially all of the remaining organic material while keeping the tertiary separatory equipment free of condensed steam and moisture. The condensed product here, which is terephthalic acid often with a considerably higher content of impurities than the secondary condenser product, is also recovered to conserve the overall yield of the process.

Alternatively, the tertiary condensation can be omitted and all of the normally solid organic compounds in the gaseous effluent from the primary condenser may be condensed in a secondary condenser, preferably operating like the aforesaid tertiary condenser at the lowest separation temperature suitable for avoiding condensation of moisture.

In this process, steam serves as a carrier for solid particles of crude acid, an assistant to facilitate vaporization thereof, a coolant to selectively regulate the primary condensation of terephthalic acid, an entraining or carrier gas for sweeping or clearing out the small amount of impurities in the vapor phase and, optionally, it may supply a substantial part of the heat of vaporization of the crude material or be used as an atomizing agent in lieu of pump pressure for spraying cooling water into any of the condensers. Further, superheated steam can be utilized for heating to minimize the deposition of solid material in the vapor inlets of the condensers. Steam inputs to the sublimation apparatus, condensers and other equipment may be regulated to provide controlled vapor velocities for maintaining solids in suspension at various stages of the process. In addition, the steam atmosphere inhibits the normal tendency of terephthalic acid to undergo conversion into anhydride material (usually of discolored appearance) by dehydration at the high temperatures involved in sublimation. Moreover, steam is cheap and readily regulated in respect to temperature and pressure; it presents no unusual corrosion problems or health hazards; it is easily separated from the product in conventional equipment, and clean steam does not contaminate the product. Where a product of extremely high purity is desired, for example, a sodium content of less than 2 p.p.m., the removal of entrained moisture from any saturated steam employed and the filtration of all steam which contacts the terephthalic acid is recommended. These steps are also beneficial in reducing the load on the ash removal device. Entrained moisture may be readily removed from the steam in conventional apparatus, such as an axial flow cyclone or a mesh demister. A filter of porous stainless steel or other suitable non-corrosive porous material may be used for filtering steam.

To illustrate the novel process more specifically, impure dry terephthalic acid in nontacky condition at ambient temperature is fed at a constant rate by means of a rotary solids valve or screw conveyor into a rapidly moving stream of steam that is preferably superheated to a temperature around 600 to 750° F. prior to introduction. If so desired, the steam temperature may be as low as about 220° (desirably above 400°) or as high as about 1000°. The molar ratio of steam to terephthalic acid may be as low as about 5:1 but a ratio of about 15:1 or 20:1 is generally preferable. From a standpoint of economy in the size of the equipment and in utilizing heat energy, the carrier steam rate should be kept as low as possible but still sufficient to facilitate vaporization of the terephthalic acid by the "steam distillation" effect. In a vaporizer line of appropriate diameter, the resulting flow rate is usually well above the minimum linear velocity of about 20 to 40 feet per second, depending on particle size, which is generally necessary to keep the particles of crude acid in suspension while being transported and vaporized in a horizontal pipe or tube. In the case of a vertical pipe, a lower linear vapor velocity is sufficient for the purpose; accordingly, the vaporizer line may be disposed either horizontally or vertically.

The gaseous suspension of solids is further heated, for example, while passing through the tube side of a tubular furnace to vaporize the terephthalic acid; and while it is contemplated that the maximum temperature of the inside tube wall may be as high as about 980° F. in some instances, it is usually not desirable to have a wall temperature above about 900° in order to avoid the decomposition of any terephthalic acid particles which may come into contact with the tube wall prior to complete vaporization of the particles. Heating of the carrier stream is controlled so that the mixture of steam and vapors of terephthalic acid and its organic impurities leaves the vaporizer at a temperature of preferably at least about 25° F. above the dew point of terephthalic acid in the mixture but below the temperature level at which the acid decomposes at an appreciable rate. The carrier stream also frequently contains a very small amount of nonvolatile solid particles of about 0.05 to 50 microns particle size and this ash may be removed by passing the vapor stream through porous filters constructed of sintered stainless steel powder or other heat resistant material which is not subject to corrosion under the conditions of the instant process. Such filtration may be preceded by separation of the ash in a cyclone separator in cases where the nonvolatile solids content of the vapor stream is running high.

In one embodiment of the invention, the vapor stream enters the primary condenser through the central port of the mixer which is preferably of concentric design with either one or two annular ports for the introduction of steam. A relatively slow cooling rate is usually preferred as that favors the formation and growth of large particles of solid condensate by providing sufficient time for particles to grow in size by the further condensation of additional terephthalic acid on small particles. Large particles are easier to separate, collect and handle in the loading and unloading of commercial shipping containers than finer particles.

In promoting this slower cooling, superheated steam at a temperature within about 150° F. above or below the vapor inlet temperature may be injected from the inner annulus immediately around the periphery of the central vapor laden carrier stream, while saturated steam at a temperature between about 150 and 400° F. below the vapor inlet temperature may be introduced through the outer annulus as an annual stream surrounding the stream of superheated steam. The saturated steam employed as a coolant is injected at a temperature substantially below the dew point of the carrier stream at the condenser inlet, for example, at a temperature between about 220 and 450° F.; thus, one may employ a clean exhaust steam at a typical gauge pressure of about 10 to 20 pounds per square inch (p.s.i.g.). The superheated steam introduced into the condenser is usually at a temperature between 600 and 750° F., corresponding to about 360 to 490° of superheat. For instance, with the carrier stream entering at a temperature of 675° F., the superheated steam may be brought in at 650° F. and the saturated steam at 350°. For optimum primary condensation, the vapor stream enters at a temperature about 25° F. above the dew point of the terephthalic acid therein and superheated steam is introduced at a temperature ranging from the dew point to 25° thereabove. The higher temperature steam is injected adjacent to the gaseous carrier stream so that these two streams will tend to mix first and to provide a lower rate of cooling the vapor stream. Also, the superheated steam heats and shields any exposed portion of the injector, especially the wall of the passage admitting the coolant steam, from the deposition of terephthalic acid thereon. Initially the lower temperature steam is adjacent to the condenser pipe wall thereby minimizing heat transfer through the wall in this region in cases where the condenser is not heated externally.

The relative flow rates of saturated and superheated steam are determined largely by the temperature desired in the primary condenser after the three streams are well mixed. Such mixing in the condenser permits the use of streams of plant steam at available temperatures instead of necessitating a stream of steam at a carefully controlled temperature as would be required in injecting only one stream of steam into the condenser. Moreover, a single stream of steam would necessarily be introduced at a temperature below the dew point of the terephthalic acid vapor stream and this can result in substantial deposits of solids on the condenser wall. In the case of a horizontal condenser, a higher molar ratio of entrainer gas to terephthalic acid may be necessary to maintain the condensed solids in suspension during passage through the primary condenser because the primary condenser is usually of considerably greater diameter than the vaporization line. The necessary carrier gas rate through the condenser may be adjusted and maintained at a suitable linear gas velocity by regulating the introduction of superheated steam here for this purpose as well as for moderating the cooling rate.

In promoting a lower rate of cooling, the coolant steam may be injected into the carrier stream at a number of points along the length of the primary condenser instead of introducing the entire quantity of cooling material at a single location, thereby reducing the stream temperature in graduated steps. With such multiple injection, it is contemplated that in most instances only saturated steam at a relatively low or moderate temperature need be introduced at the downstream coolant injectors or mixers.

The temperature of the vapor stream at the condenser outlet or adjacent separation device where the sublimate is separated from the vapor stream (e.g., a cyclone or filter) is a significant process variable. This separation temperature together with the less influential molar ratio of steam to terephthalic acid largely determine the percentage recovery or condensation in the primary condenser and also the purity of the sublimate. There is an inverse relationship of purity and recovery, for increasing the outlet temperature enhances the purity of the product at the expense of a lower recovery at this stage, and decreasing the temperature results in lower purity and a higher percent recovery. Present indications are that a solid separation temperature around 520° F. is the optimum for producing terephthalic acid of high purity. In a lesser degree, increasing the proportion of steam relative to vaporized solids increases the purity of the condensed solids but with a lower percent recovery and vice-versa. Under optimum conditions more than 82% by weight of the charge may be condensed in each primary condensation stage with a p-carboxybenzaldehyde content at least 92% lower than that of the charge, but the percentage of solids recovered is somewhat less as it is dependent on the collection efficiency of the cyclone or other separation device.

In one embodiment of the invention, which is preferred in some cases, the wall or boundary surfaces of the one or more primary condensers and optionally that of the secondary condenser, are maintained at temperatures at least equal to the dew point of the terephthalic acid in the proximate or adjacent portion of the mixed stream therein. Such interior wall temperatures preferably range from the dew point to about 25° F. higher and the optimum may be about 5° higher than the dew point. It will be appreciated that the dew point decreases while the total stream is traveling through the condenser and terephthalic acid vapor is condensing into solid particles; hence the final or outlet section of the primary condenser may be maintained at lower temperatures than the inlet end. This may be readily accomplished by jacketing the condenser and passing flue gas from the vaporizer furnace in regulated volume and temperature through the jacket surrounding the condenser in concurrent flow with the condensing vapor stream inside the condenser. Alternatively various sections along the length of condenser may be heated by any suitable heating media to temperatures decreasing stepwise in the direction of vapor flow. With an externally heated condenser wall as indicated, any sublimed material tending to adhere to the wall will be vaporized and thus eliminate accumulation of deposits on the wall. This heating supplements the effect of maintaining sufficient gas velocities to keep the condensing particles in suspension. Although a minor amount of heat will often be added to the vapor stream in such installations, this can be readily handled by increasing the input rate or decreasing the temperature of the saturated coolant steam; moreover, the heat gain per unit quantity of total vapor stream passing through the condenser can be reduced by increasing the diameter of condenser as this decreases the ratio of wall surface to volume within the pipe and, more importantly, reduces the vapor velocity with a consequent decrease in heat transfer from the wall to the vapor stream. Heating the condenser wall is beneficial not only in minimizing or eliminating the deposition of solids in the condenser but also in facilitating accurate control of condensation temperatures.

The primary condenser may be a vessel or a single pipe run or a plurality of pipes connected by U-bends or other piping arrangement of suitable length and diameter to provide the desired residence time, and in some applications, the desired heat transfer through the walls. For the present purposes, the residence time in all primary and secondary condensers is measured from the point of introducing a coolant into the vapor stream to the point at which the resulting condensed solids are separated from the stream. A relatively long residence time or slow cooling rate is helpful in promoting the condensation and growth of the desired relatively large sublimate particles. However, there are indications that overly long residence times in the primary condenser, for example, 30 seconds in some instances, tend to produce the needle shaped particles with difficult handling characteristics. Therefore, in many cases it is desirable to restrict the residence time sufficiently to avoid any substantial formation of elongated particles and obtain essentially particles of approximately spherical configuration.

Usually a linear gas velocity of about 5 to 150 feet per second is maintained in the primary condenser. Similar gas velocities may be employed in secondary and tertiary condensers. In preventing the deposition or accumulation of condensed terephthalic acid on the condenser wall, the necessary minimum velocity will depend on the average particle size of the material condensing, the orientation of the condenser and whether or not externally heating is used. The linear gas velocity may be as low as 0.5 foot per second in an externally heated vertical condenser in some instances, but a velocity above about 5 feet per second is generally desirable.

While the condenser may be oriented horizontally or at any angle, a vertical disposition is preferable in many cases since it requires the lowest gas velocity for suspending and transporting the particulate solids. The particle size of this solid material is generally so small that the effect of gravity is insignificant and little difference exists between the actual solids flow (or residence time) vertically upward and vertically downward. Where it is feasible, downward vertical flow is preferred as it tends to sweep along toward the separator any of the heavier condensed particles that may tend to drop out of suspension. With a vertical primary condenser, the supply of steam and/or water can be controlled mainly or entirely on a heat balance basis to obtain the selected solids separation temperature (condenser outlet temperature) with little or no necessity for injecting additional steam to maintain an increased vapor velocity for conveying solid particles. This will permit a substantial reduction in the supply of superheated steam to the condenser, as much of this steam is utilized for carrier rather than cooling purposes. In fact, in some instances, it may be possible to inject only saturated steam into the primary condenser as a coolant.

On the other hand, a linear gas velocity of the order of about 40 or more feet per second, is required in horizontal condenser pipes to prevent settling of the suspended particles therein. Extremely high gas velocities, say 400 or more feet per second, increase the power cost unnecessarily, are likely to reduce the product particle size by attrition and may severely erode the lines.

It is highly desirable to eliminate or minimize the deposition of solids on condenser surfaces as such deposits increase the pressure drop through the condenser thereby increasing the power consumption; moreover, the deposits decrease the heat transfer through the condenser wall and necessitate frequent shutdowns for laborious cleaning. Where U-bends are employed in connecting several vertical runs of condenser piping, less difficulty is encountered than in horizontally aligned piping because of the relatively small internal surface area in the U-bends and the greater turbulence of flow at these locations.

Another reason for avoiding the deposition of terephthalic acid particles in the condenser lines is the fact that this material frequently exhibits some surface tackiness at the operating temperatures encountered in primary condensers. Steep walls are recommended for the bottoms of cyclone separators and hoppers handling terephthalic acid particles, especially when the material is hot, in order to minimize the bridging and sticking of the solids in these devices. Low frequency mechanical thumping also alleviates this problem, and it is often desirable to maintain a gas pressure drop in the direction of solids flow across rotary valves and screw conveyors utilized in feeding or transporting the acid particles.

The vapor phase leaving the cyclone or other separator associated with the primary condensation system is generally delivered to a secondary condenser and, in many instances, subsequently to a tertiary condenser for the recovery of the organic components in that vapor. In addition to steam, this gaseous mixture usually contains substantial amounts of uncondensed terephthalic acid vapor along with extremely fine entrained solid particles thereof which were not separated in a separator of the cyclone type plus most (often 90% or more) of the more volatile impurities including p-carboxybenzaldehyde, p-toluic acid and terephthalic aldehyde.

The secondary condenser is typically a cylindrical vessel or pipe of relatively large diameter having a nozzle concentrically mounted therein for spraying water into the vapor stream as it enters this line condenser and an associated cyclone or filter is provided for separating the condensed solids from the gaseous phase. A fine spray of water is sprayed under pressure into the vapor stream at a rate sufficient to cool the gaseous stream enough to condense a substantial fraction of the remaining terephthalic acid and some of its volatile impurities without condensing any steam or moisture while the coolant water shower is completely vaporized in effecting the cooling. For illustration, the separation temperature in the secondary condenser cyclone may be maintained at an optimum temperature of about 370° F. or midway between the separation temperatures of the primary and tertiary condensations. With the additional amount of vapor provided here by the vaporization of the cooling water, the deposition of solids is less of a problem in the secondary condenser than in the primary condenser. However, vertical orientation is preferred for both types of condensers for maximum economy of heat, power and size of equipment as well as the increased flexibility of operation wherein longer residence times may be employed in condensers of any given size before the deposition of solids becomes a limiting factor. The secondary condenser may often desirably be externally heated with flue gas, etc., to maintain the interior wall temperatures above the dew point of the proximate portion of the condensing vapor. Solids recovered in the secondary condensers, depending on the purity, are either added to the final product or recycled to the initial sublimation stage when the content of impurities is not substantially in excess of that in the fresh charge; but in some instances it may be desirable to recycle this material to the partial oxidation reaction or the associated leaching step.

From the secondary condenser cyclone, the gaseous phase may be taken overhead to a tertiary condenser which is similar to the secondary condenser and operated in the same manner except that the rate of injecting cooling water is preferably regulated to bring the separation temperature in the bag filter or other separator down to the minimum feasible for avoiding the condensation of any significant amount of moisture (e.g., 220–250° F.). Again all of the cooling water is vaporized in cooling the vapor stream. Here, substantially all of the organic matter in the entering vapor is condensed and separated. This condensate is essentially terephthalic acid with a considerable greater content of impurities than the fresh sublimation charge; hence it is desirably recovered by being returned to the preliminary leaching purification step or to the reactor in which p-xylene is being oxidized rather than by recycling it to the fresh charge where it would build up the total concentration of volatile impurities by retaining substantially all of the volatile impurities in the system.

The gaseous stream leaving the tertiary condenser separator consists almost entirely of steam which is thereafter usually condensed in a conventional water scrubber or jet condenser, and the vacuum developed thereby may be used to assist in conveying the vapor-laden carrier stream through the sublimation purification system.

For convenience of illustration, ranges of some of the process variables involved in the present invention may be tabulated as follows:

| | Suitable range | Preferred range |
|---|---|---|
| Vaporizer coil: | | |
| Entrainer gas flow, mol/mol TPA | 5–150 | 10–30 |
| Entrainer gas composition, mol percent steam | 39–100 | 79–100 |
| Maximum inside tube wall temp., ° F | 589–980 | 650–800 |
| Outlet vapor temp., ° F | 560–800 | 620–770 |
| Static pressure at inlet, p.s.i.a | 1–50 | 8–30 |
| Primary condenser: | | |
| Vapor inlet temp., ° F | 560–750 | 620–709 |
| Superheated steam temp., ° F | 560–900 | 600–750 |
| Saturated steam temp., ° F | 220–450 | 260–370 |
| Linear gas velocity, ft./sec | 0.5–400 | 5–150 |
| Residence time, sec | 0.5–20 | 1.5–8 |
| Solids-gas separation temp., ° F | 350–570 | 400–540 |
| Total entrainer gas flow, mol/mol TPA | 10–500 | 20–100 |
| Static pressure at outlet, p.s.i.a | 1–45 | 15–25 |
| Secondary condenser: | | |
| Linear gas velocity, ft./sec | 0.5–200 | 5–100 |
| Residence time, sec | 0.5–30 | 1.0–10 |
| Solids-gas separation temp., ° F | 220–400 | 360–390 |
| Static pressure at outlet, p.s.i.a | 1–25 | 15–18 |
| Tertiary condenser: | | |
| Linear gas velocity, ft./sec | 0.5–200 | 5–100 |
| Residence time, sec | 9.5–30 | 1.9–10 |
| Solids-gas separation temp., ° F | 212–360 | 220–250 |
| Static pressure at outlet, inches water gauge | 0–55 | 5–15 |

For a better understanding of the nature and objects of this invention, reference should be had to the accompanying drawings.

BRIEF DESCRIPTION OF DRAWINGS

FIG. 1 is a flow sheet or schematic representation of a system suitable for the practice of the present invention.

Figure 2:
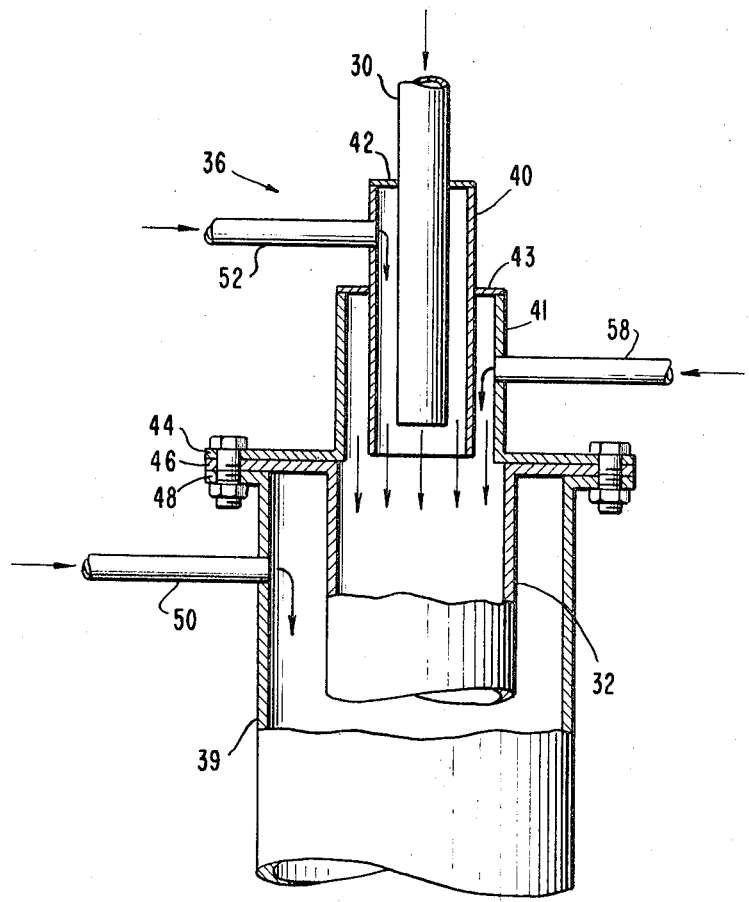
FIG. 2 is a detailed fragmentary longitudinal section taken on the center line of one embodiment of the primary condenser to illustrate external heating and the injection of steam into the sublimed vapor.

For clarity, many conventional items including valves, control instruments, accessories and auxiliary equipment have been omitted from the flow sheet because such apparatus and its use are well known in the art.

Turning now to FIG. 1 crude terephthalic acid is charged to the feed hopper 2 provided with a ribbon agitator 4 driven by an electric motor 6 at a slow speed to prevent sticking or packing of the powdered solids in the hopper. A rotary solids valve 8 below the hopper serves to feed the finely divided acid at a uniform rate into a high velocity stream of steam passing through the transfer line 10 below the feeding device, thereby forming a relatively dilute suspension of solid particles in the carrier stream. Clean saturated steam obtained from the supply line 12 and valved line 14 may be utilized, but clean superheated steam is usually preferred as the entraining or carrier gas and this may be obtained from the supply line 16 and valved branch line 18. The entrainer steam carries the acid charge in suspension as a dust to the vaporizing coil 20 in furnace 22. When superheated steam at a temperature above 600° F. is used as the carrier agent, a portion of the crude acid is vaporized in the transfer line 10 on its way to the furnace. The furnace temperature is controlled in known manner so that the maximum internal tube temperature is between 650 and 800° F. The terephthalic acid is completely vaporized during passage through the coil 20 with the exception of a small amount of ash or other nonvolatile material. The mixture of hot vapor and steam is carried through the insulated line 24 to the cyclone separator 26 where part of the ash is separated and withdrawn in pipe 28 while the gaseous material continues on in overhead line 30 to the primary condenser. Ash separation is optional at this point, the cyclone 26 may be bypassed unless perhaps the nonvolatile content of the vapor stream is unusually high.

This particular embodiment of the condenser is made up of several lengths of vertical pipe 32 connected by U-bends 34 and equipped with one or more annular steam injectors 36 and 38.

A suitable steam injector is shown in detail in FIG. 2 attached to the embodiment of the primary condenser 32 which is surrounded by a heating jacket 39. This embodiment of the injector consists of a concentric welded assembly of pipe 30 and pipe nipples 40 and 41 in which one end of each of the nipples 40 and 41 is covered by a welded plate and the other end is open for free communication with the inlet end of the primary condenser tube 32. Thus, pipe 40 is closed by the annular plate or disk 42 which is welded to both nipple 40 and to pipe 30 and pipe 41 is closed in similar fashion by the plate 43 welded to nipples 41 and 40. The injector assembly 36 has a flange 44 welded on its open end for attachment by means of bolts to flanges 46 and 48 on the condenser tube 32 and jacket 39 respectively. A pipe 50 connects with the upstream end of heating jacket 39 for the admission of the heating medium (e.g., flue gas from furnace 22) to the annular space between condenser pipe 32 and jacket 39. The heating medium leaves the downstream end of the jacket through an outlet connection (not shown).

In operating the first stage of the primary condenser, the mixture of terephthalic acid vapor and gaseous carrier enters the condenser tube 32 from the pipe 30 at a temperature of 650° F. and it is joined by two annular streams of steam. Superheated steam obtained from the conduit 16 and the branch line 52, as shown in FIG. 1, is admitted at a temperature of 650° to the inner annulus between nipple 40 and pipe 30 at a constant rate which may be controlled by an automatic flow controller (not shown) or valve in line 52. A stream of saturated steam at a temperature of 350° F. is introduced via supply line 12 and conduits 54, 56 and 58 into the outer annular zone between nipples 41 and 40. The rate of injecting the saturated steam is regulated by means of the automatic valve 60 in response to signals from a temperature controller 62 located immediately upstream of the second steam injector 38 in order to control the degree of cooling that takes place in the first portion of this primary condenser stage. Thus, the hot mixed vapors of terephthalic acid and steam entering the first vertical condenser tube 32 are first joined by a stream of superheated steam around the periphery of the mixed vapor stream at the same or a higher temperature while a second annular stream in the form of saturated steam at a temperature about 300° lower surrounds and blankets the superheated stream for a short time before all three streams are thoroughly mixed.

Optionally, steam is also injected into the condensing stream of terephthalic acid-laden vapor at one or more additional points downstream in the first stage of the primary condenser using a steam injector 38 similar to injector 36 except that it usually has a single annular port for introducing steam. Preferably only saturated steam is injected at the downstream sites. In some of these downstream installations, condensing solids may tend to deposit upon the injector wall adjacent to the incoming saturated steam which cools the injector wall to a temperature lower than the dew point of the adjoining portion of the vapor stream. This difficulty may be readily overcome by substituting a double annulus injector of the type shown in FIG. 2 and admitting superheated steam at a low rate through the intermediate annular port to warm the injector enough to eliminate or minimize such deposition. The saturated steam is delivered to the injector through the conduits 12, 54, 56 and 64 and the input of steam is controlled by the automatic valve 70 in response to signals from the sensing device of the temperature controlled 72 which is located immediately upstream from the primary condenser cyclone 74. With the separator 74 operating at a temperature of 500° F. under the control of the temperature regulator 72, the uncondensed material comprising all off the steam, a substantial amount of terephthalic acid (including a small quantity of fines), most of the volatile impurities associated therewith and usually a very small amount of fine ash is withdrawn overhead through the valved line 76 to the secondary condenser described hereinafter.

With the bare condenser pipe 32 illustrated in FIG. 1, there is a considerable heat loss from the condensing vapor stream through the pipe wall which may account for about half of the drop in stream temperature from the inlet to the outlet of the condenser with absorption of heat by the coolant steam accounting for the other half. For better regulation of the stream temperatures, it may be desirable in some instances to cover the pipe 32 with a layer of heat insulating material over its entire length or perhaps only over the section adjacent to the condenser inlet in order to reduce and control heat transfer through the pipe wall by minimizing the effect of large variations in the atmospheric temperature.

On the other hand, with the embodiment shown in FIG. 2, flue gas, superheated steam or another fluid heating medium flows through the annular space around the condenser line or vessel within the jacket 39 in the same direction as the condensing vapor stream. The jacket may extend the full length of the condenser or it may cover only one or more sections adjacent to the inlet end, middle or outlet end of the condenser if so desired. Also the jacket may be divided along the length of the condenser into separate zones or compartments having independent inlets and outlets for heating media if it is desirable to provide more precise zoning of temperatures along the condenser wall. Any tendency toward plugging of this equipment may be eliminated by maintaining the interior wall of the condenser slightly above the dew point of the carrier stream in that vicinity. With a jacketed condenser, the coolant steam plays a far more important role in governing the condensation of terephthalic acid for the transfer of heat through the condenser wall is usually reversed here with the vapor stream absorbing some heat from the heated wall of the condenser.

The first stage primary condenser product is separated in the high efficiency cyclone separator 74 which is desirably provided with a conical bottom of steep slope and vibratory apparatus of low frequency and large amplitude characteristics to minimize sticking and bridging in the bottom of the cyclone. This intermediate product of relatively high purity in the form of fine particles which typically range in size from about 0.5 to 20 microns is withdrawn at the lower end of the cyclone. It is then fed by the screw conveyor or rotary valve feeder 78 at a constant rate into the transfer line 80 where it is picked up in a stream of superheated steam from line 16 and carried to the vaporizing coil 82 in the furnace 22 for a second stage sublimation purification. Vaporization of the once-sublimed material is accomplished in part by the superheated steam in line 80 and completed in the furnace coil 82 from which the vapor steam exits with a temperature of 750° F. into the transfer line 84 which carries the revaporized material and steam to another cyclone separator 86. Much of the ash, any scale and other nonvolatile impurities are removed from the vapor stream in this cyclone and withdrawn through bottom line 88 while the gaseous stream is taken off overhead through lines 90, 92 and 94 to the ash removal filters 96 and 98 which are connected in parallel.

Within these filters, the vapor stream is filtered by passing it through the walls of a group of cylindrical metal cartridge filters (not shown) connected in parallel and constructed of porous sintered stainless steel having a pore size suitable for removing essentially all of the particles of contaminating nonvolatile solids.

Such filters must be cleared occasionally by the blowback technique, that is the reverse flow of a suitable inert gaseous substance to dislodge the solids deposited on the filtering surfaces; hence two or more filters are provided so that there will be no interruption of the flow of sublimed vapor while a filter is being cleared by blowback. In the present system, provision is made for blowing back one of the filters at a time using superheated steam from conduit 16 and either line 99 or 100 at a temperature well above 600° F. and sufficiently high pressure to clear the filter preferably using automatic control means which are not shown. While a filter is subjected to blowback, its vapor inlet and outlet lines are closed. The small amounts of solids separated from the vapor stream by these filters are occasionally removed from the filters through the bottom lines 104 and 106 during blowback periods of the operating cycle. After prolonged operation, the pressure drop through the filter will tend to increase despite frequent blowbacks. This condition may be corrected with chemical agents by immersing the filter cartridge in hot aqueous sodium hydroxide, rinsing, then immersing in warm concentrated nitric acid, rinsing and drying.

If the quantity of ash or other solids in the vapor stream in line 84 is relatively low, the cyclone 86 may be omitted and all of the nonvolatile solids separated in the filters. On the other hand, when it is not essential that the final product have an absolute minimum of nonvolatile impurities in the form of metal compounds, the filters 96 and 98 may be omitted and the cyclone 86 alone be used in the second purification stage for reducing the content of nonvolatile material. As illustrated in FIG. 1, when porous metal filters are employed in a multistage sublimation, these filters should be located immediately before the primary condenser of the final stage.

After passing through the filters, the vapor streams are carried overhead through lines 101 and 102 to the conduit 108 which leads to the steam injector 110 and vertical condenser tubes 32 connected by U-bends 34. The operation of the second stage primary condenser is essentially the same as in the first stage. Superheated steam from the supply line 16 is admitted to the inner annulus of the concentric steam injector 110 of the same type as in FIG. 2 through the valved line 112 at a constant rate, while saturated steam from line 54 is being admitted to the outer annulus of injector 110 through line 114 under the control of automatic valve 116 and the downstream temperature controller 118. A second steam injector 120 is located downstream and saturated steam only is injected here from line 54 and pipe 122 under the regulation of automatic valve 124 and temperature controller 126. If desired, the injector 120, like injector 38, is usually constructed with a single annular passage for the steam inasmuch as only one type of steam is customarily injected at this point unless sublimate deposits tend to accumulate on the injector. The stream of condensed terephthalic acid solids suspended in the uncondensed vapor passes into the cyclone separator 128 from which the final product is withdrawn via rotary valve or screw conveyor 130 and line 132.

The vapor phase taken off from cyclone 128 in line 134 is similar in composition to the vapor leaving cyclone 74 in pipe 76, but it has a lower content of the volatile impurities. The streams from these two cyclones join and are carried together in conduit 136 to the secondary condenser 138, which like the two primary condensers, may be a line condenser. Thus, the secondary condenser may be simply a vertically disposed arrangement of one or more tubes or pipes of appropriate size and length to provide sufficient volume and residence time for the condensation of a sizable fraction of the normally solid substances remaining in the vapor stream. Fractional condensation is accomplished by spraying demineralized water from the supply line 140 downward through one or more spray nozzles or a showerhead (not shown) located at the top of condenser pipe 138. The water rate is regulated by the automatic valve 142 in response to the temperature controller 144 which has a sensing element in pipe 138 near the inlet to cyclone 146. The latter instrument is customarily adjusted to maintain an outlet or solids-gas separation temperature of about 380° F. by controlling the introduction of sufficient water to condense the desired proportion of the organic material in the vapor stream for recovery and reuse without condensing any of the steam introduced as a carrier agent and in the primary condensation steps. Consequently all of the water sprayed into the second condenser is vaporized in cooling the vapor stream and thus condensing a portion of the normally solid organic materials.

Separation of the resulting solid particles is accomplished in the cyclone separator 146 and this material is withdrawn through the rotary feeder valve or screw conveyor 148 and conduit 150. The powdered material is recycled to sublimation feed hopper 2 as it is essentially terephthalic acid with a content of p-carboxybenzaldehyde and other impurities sufficiently low for direct return to the sublimation process. Alternatively, this impure material may be recycled to the leaching operation or less desirably as feed to the p-xylene oxidation.

The vapor phase from the secondary condensation is taken overhead in line 154 to a tertiary condenser 156 which is preferably similar in construction to the secondary condenser. This charge is mainly steam and it contains a minor percentage of normally solid organic materials in the vapor state and as entrained fine solid particles. Although the organic components still include a major proportion of terephthalic acid, the percentage of vaporizable impurities associated therewith is considerably greater than in the vapor effluents from the primary condensers. The tertiary condenser is operated similarly to the secondary condenser with water from pipe 158 sprayed into the incoming vapor at the top of condenser line 156 under the regulation of the automatic valve 160 in response to temperature controller 162 located near the inlet to the bag filter and collector 164. In this third condensation stage, all of the cooling water is vaporized and substantially all of the remaining organic compounds are condensed without condensing any steam.

In accomplishing this, controller 162 is set to maintain the lowest feasible temperature (usually about 220° F.) suitable for keeping the bag filter free of condensed moisture. Cloth woven from wool or acrylic fibers may be employed in this filter.

The solid particles accumulating in the bottom of the bag filter 164 are carried by the screw conveyor 166 to the conduit 168 for return to the preliminary leaching step or for charging to the p-xylene oxidation reactor to improve the overall yield as the content of vaporizable impurities in this terephthalic acid is higher than is desirable for recycling directly to the sublimation step. In view of the difficult flow characteristics of terephthalic acid particles, the various screw conveyors and rotary feeder valves employed in the processing equipment described herein are equipped with suitable conventional means for providing a small pressure drop across the feeder or conveyor in the direction of flow.

The vapor phase leaving filter 164 in line 170 contains essentially steam and insignificant amounts of uncondensed material. Such steam is condensed in a barometric jet condenser to produce a vacuum which assists in conveying the vapor mixtures and suspensions through the system.

In instances where a product of sufficient purity can be obtained in a single sublimation stage, the aforesaid system can be simplified by omitting the vaporization coil 20 and the remaining equipment associated with the first stage primary condenser and instead connecting the transfer line 10 directly to vaporization coil 82 in the furnace. This is preferable to omitting the second stage primary condensation apparatus inasmuch as it retains the ash filters 96 and 98 for the purpose of substantially eliminating all nonvolatile solids from the primary condensation operation.

It is also contemplated that the process described earlier may be simplified for certain applications by omission of the tertiary condensation step. This can be accomplished by connecting the line 136 carrying the vapor phase effluents from the primary condensation stages directly to the condenser 156 and condensing substantially all of the normally solid organic matter in the vapor stream there without condensing steam or moisture in a secondary condensation under conditions approximating those described before for tertiary condensation. More cooling water is required since the charge vapor enters the condenser at a higher temperature and more material is condensed to the solid state. The impure terephthalic acid solids condensed in this secondary condensation are withdarwn from the bottom of bag filter 164 and recycled to the preliminary leaching operation or the p-xylene oxidation.

A more complete understanding of the invention is obtainable by referring to the following tabulated examples performed without secondary condensation in a small scale unit having a vaporizer coil of 5-inch nominal diameter pipe in a furnace, an ash removal cyclone and porous stainless filters, a single primary condenser made up of four horizontal 20-foot lengths of 12-inch nominal diameter pipe and a cyclone for collecting the product. The single injector for coolant steam is constructed of a central 6-inch pipe nipple for the entering terephthalic acid vapor stream concentric with 8-inch and 10-inch pipe nipples for the superheated steam and saturated steam, respectively, all mounted on a 12-inch pipe flange attached to the flange of the initial run of primary condenser pipe. The charge in the examples is a leached crude terephthalic acid prepared by the partial oxidation of p-xylene and then subjected to a prolonged leaching at an elevated temperature with acetic acid. In the case of Examples 3 and 5 the feed is the product of a previous single sublimation operation; hence, these two examples illustrate the final stage of a multistage sublimation process. Unless otherwise stated, all proportions are set forth in terms of weight and all temperatures are given in degrees Fahrenheit in this specification.

|  | Example No. | | | | | | | |
|---|---|---|---|---|---|---|---|---|
| Operating conditions | 1 | 2 | 3 | 4 | 5 | 6 | 7 | 8 |
| Terephthalic acid (TPA) feed rate, lb./hr | 98.6 | 222 | 230 | 343 | 293 | 350 | 314 | 289 |
| Entrainer steam/TPA feed, mol ratio | 122 | 27 | 52 | 35 | 41 | 35 | 38 | 39 |
| Temp. of entrainer steam supply, °F | 636 | 665 | 653 | 652 | 657 | 650 | 653 | 662 |
| Steam-TPA temperature entering furnace, °F | 549 | 502 | 467 | 523 | 537 | 498 | 519 | 523 |
| Steam-TPA temperature leaving furnace, °F | 722 | 740 | 748 | 716 | 754 | 744 | 760 | 763 |
| Average residence time in furnace, sec | 0.16 | 0.29 | 0.16 | 0.15 | 0.16 | 0.16 | 0.17 | 0.19 |
| Vaporizer coil inlet pressure, p.s.i.a | 20.9 | 19.7 | 20.4 | 17.3 | 19.3 | 20.0 | 22.6 | 25.2 |
| Temperature at primary condenser inlet, °F | 662 | 655 | 677 | 666 | 668 | 667 | 688 | 689 |
| Flow rate of saturated steam coolant, lb./hr | 3,050 | 5,878 | 2,300 | 2,000 | 2,160 | 2,672 | 2,114 | 1,887 |
| Temp. of saturated steam coolant, lb./hr | 340 | 340 | 345 | 340 | 340 | 340 | 340 | 340 |
| Flow rate of superheated steam, lb./hr | 932 | 932 | 932 | 932 | 932 | 932 | 932 | 932 |
| Temp. of superheated steam, °F | 650 | 652 | 652 | 655 | 650 | 652 | 650 | 655 |
| Total steam flow in primary cond., lb./hr | 5,282 | 7,510 | 4,532 | 4,232 | 4,387 | 4,924 | 4,335 | 4,042 |
| Total steam flow in prim. cond., mol/mol TPA | 493 | 312 | 182 | 114 | 138 | 130 | 127 | 129 |
| Primary cond. outlet (Cyclone) temp., °F | 445 | 428 | 503 | 502 | 501 | 510 | 526 | 508 |
| Pressure at primary cond. outlet, p.s.i.a | 14.7 | 14.7 | 14.7 | 14.7 | 14.7 | 14.7 | 14.7 | 14.7 |
| Pressure drop in primary condenser, p.s.i | 2.4 | 1.5 | 0.1 | 0.3 | 0.9 | 0.2 | 1.3 | 4.0 |

| Operating results | Feed | Prod. | Feed | Prod. | Feed | Prod. | Feed | Prod. | Feed | Prod. | Feed | Prod. | Feed | Prod. | Feed | Prod. |
|---|---|---|---|---|---|---|---|---|---|---|---|---|---|---|---|---|
| p-Carboxybenzaldehyde content, p.p.m | 3,300 | 227 | 3,300 | | 850 | 23 | 3,600 | 153 | 130 | 5 | 7,000 | 310 | 4,200 | 340 | 4,250 | 270 |
| Ash content, p.p.m | | | | | 167 | 8 | | | | | | | | | | |
| Solution colors, APHA: | | | | | | | | | | | | | | | | |
| 5% in dimethyl formamide | 25 | 15 | 25 | | | | 10 | | | | | | 15 | | 10 | 10 |
| 1% in sulfuric acid | 20 | 15 | 20 | | | | 10 | | | | | | 15 | | 15 | 15 |
| p-Carboxybenzaldehyde reduction, percent | 93.1 | | | | 97.0 | | 95.8 | | 96.2 | | 95.6 | | 91.9 | | 93.5 | |

Settling of solid particles from a gaseoous suspension is, of course, more of a problem during horizontal flow than vertical flow. However, to minimize the settling of condensing particles during passage of the carrier stream through the horizontal primary condenser, high stream velocities are maintained here by employing higher total steam:terephthalic acid ratios than those preferred for large scale commercial operations. Accordingly, no difficulty is experienced with plugging of the condenser tubes and transfer lines or excessive pressure drops therein in lengthy runs ranging from about 7 to 90 hours.

From the tabulated data it is readily apparent that a high degree of purification is obtained consistently by the process of this invention as evidenced by reductions of the p-carboxybenzaldehyde content amounting to well over 90% in each sublimation stage and by the distinct improvement in the American Public Health Association (APHA) solution colors of the product in dimethylformaldehyde and in sulfuric acid.

In addition, no other impurities are introduced by this physical purification process and it provides superior control for balancing recovery and the degree of purification per stage in extremely simple equipment.

While the process of the present invention has been set forth in considerable detail in the foregoing description and examples, it will be readily apparent to those skilled in the art that substantial changes in many of the operating conditions may be made without departing from the purview of this invention. Therefore, this invention should not be construed as limited in any particulars except as recited in the appended claims or required by the prior art.

What is claimed is:

1. In a continuous process for the purification of terephthalic acid containing material of a more volatile nature by the vaporization of said impure acid and subsequent condensation from the vapor of solid terephthalic acid of substantially improved purity, the improvement which comprises continuously feeding finely divided solid particles of said impure terephthalic acid in a non-tacky condition into a gaseous entrainer stream flowing at a velocity sufficient to substantially immediately entrain and transport substantially all of said particles, vaporizing said acid essentially while said acids is carried as a dilute suspension of solid particles in a gaseous carrier stream of substantial steam content and while indirectly heating said suspension to provide at least a substantial part of the heat required for vaporization, said carrier stream comprising said entrainer stream and containing a total of at least 5 mols of gaseous carrier material per mol of terephthalic acid fed, and thereafter separating any remaining solid material from said carrier stream prior to cooling said carrier stream sufficiently to effect said condensation.

2. A process according to claim 1 in which said vaporization is carried out in the presence of between about 5 and 150 mols of superheated steam per mol of terephthalic acid.

3. A process according to claim 1 in which said entrainer stream is flowing at a rate of from about 10 to 30 mols of gaseous entrainer material per mol of terephthalic acid and contains at least 70% by volume of superheated steam, and said vaporization is effected by heating said gaseous carrier stream to a temperature between about 620 and 770° F. by means including absorbing heat from contact with heat exchange surfaces maintained at a maximum temperature between about 650 and 800° F.

4. A process according to claim 1 in which said vaporization is effected by heating a suspension containing between about 5 and 150 mols of gaseous entrainer material of at least 30% by volume steam content per mol of terephthalic acid to a temperature between about 560 and 800° F. while in contact with heating surfaces maintained at a maximum temperature between about 580 and 900° F., and said condensed terephthalic acid is separated from the cooled carrier stream at a temperature between about 350 and 570° F.

5. A process according to claim 1 in which said condensation is effected in a condensation zone wherein a stream of superheated steam is introduced around the periphery of said carrier stream entering said zone and said superheated steam is introduced at a temperature above the dew point of the entering carrier stream.

6. A process according to claim 1 in which said condensation is effected by direct heat exchange with a coolant containing water in a fluid state.

7. A process according to claim 6 in which said carrier stream containing terephthalic acid vapor is at least partially cooled by direct heat exchange with coolant steam introduced at a substantially lower temperature than the temperature of said carrier stream.

8. A process according to claim 7 in which the temperature and the rate of introducing of said coolant steam are regulated to reduce the temperature of the resulting mixed stream to between about 350 and 570° F.

9. A process according to claim 7 in which said coolant steam is introduced at a plurality of locations substantially spaced along the path of flow of said carrier stream through a condensation zone.

10. A process according to claim 7 in which said condensation of terephthalic acid is effected within a zone wherein a stream of superheated steam is introduced around the periphery of said gaseous carrier stream entering said zone and at a temperature between the dew point of the proximate portion of said carrier stream and 25° F. thereabove, and a stream of coolant steam is introduced into said condensation zone around the periphery of said stream of superheated steam, said coolant steam being introduced at a temperature between about 150 and 400° F. below the temperature of the proximate portion of said carrier stream.

11. A process according to claim 7 in which superheated steam is introduced at a temperature between about 650 and 750° F., coolant steam is introduced at a temperature between about 260 and 370° F., and the rates of introducing said streams of superheated and coolant steam into a condensation zone are regulated to condense a substantial proportion of the terephthalic acid vapor in said carrier stream directly into solid particles and to provide a linear gas velocity sufficient to maintain the condensed terephthalic acid particles in suspension in the cooled carrier stream in said condensation zone.

12. A process according to claim 7 in which at least part of the gaseous phase resulting from said condensation is thereafter cooled by direct heat exchange with water in the liquid state to condense substantially all organic compounds remaining in the gaseous phase without substantial condensation of the steam therein.

13. A process according to claim 1 in which said condensation is effected primarily within a condensation zone having a boundary surface maintained at temperatures above the dew point of the proximate portion of said carrier stream, and a cooling medium is introduced directly into said zone.

14. A process according to claim 13 in which the residence time of said carrier stream in said condensation zone is between about 0.5 and 20 seconds and the terephthalic acid condenses in the form of substantially spherical particles.

15. A process according to claim 13 in which said vaporization is effected by heating a suspension containing between about 5 and 150 mols of gaseous entrainer material of at least 30% by volume steam content per mol of terephthalic acid to a temperature between about 560 and 800° F. while in contact with heating surfaces maintained at a maximum temperature between about 580 and 900° F., said cooling medium contains water in a fluid state and said condensed terephthalic acid is separated from the cooled carrier stream at a temperature between about 350 and 570° F.

16. A process according to claim 13 in which said gaseous entrainer stream containing at least 70% by volume by steam is flowing at a rate of between about 10 and 30 mols of gaseous entrainer material per mol of terephthalic acid charged, said vaporization is effected by heating the resulting suspension to a temperature between about 620 and 770° F. by indirect heat exchange with heating surfaces maintained at a maximum temperature between about 650 and 800° F., coolant steam is employed for direct cooling of the resulting vapor laden carrier stream, and said condensed terephthalic acid is separated from the cooled carrier stream at a temperature between about 400 and 540° F.

References Cited

UNITED STATES PATENTS 3,362,989  1/1968  McMakin et al. _____ 260—525

OTHER REFERENCES

Wilke: "Sublimation," Chemical Industries, vol. 63 (July 1948), pp. 34–38, 122, 124.

LORRAINE A. WEINBERGER, Primary Examiner

R. S. WEISSBERG, Assistant Examiner

U.S. Cl. X.R.

203—49, 96

PO-1050
(5/69)

UNITED STATES PATENT OFFICE
CERTIFICATE OF CORRECTION

Patent No. 3,526,658                    Dated September 1, 1970

Inventor(s) Howard S. Bryant, Jr.

It is certified that error appears in the above-identified patent and that said Letters Patent are hereby corrected as shown below:

| | |
|---|---|
| Column 4, line 60, | "on" should be -- in --. |
| Column 5, line 3, | "elvated" should be -- elevated --. |
| Column 11, line 45, | "39" should be -- 30 --. |
| Column 11, line 45, | "79" should be -- 70 --. |
| Column 11, line 59, | "9.5" should be -- 0.5 --. |
| Column 11, line 59, | "1.9" should be -- 1.0 --. |
| Column 13, line 32, | "controlled" should be -- controller --. |
| Column 13, line 36, | "off" should be -- of --. |
| Column 16, line 49, | "withdarwn" should be -- withdrawn --. |
| Column 17, line 4, | Under Example No. 2, first line, "222" should be -- 223 --. |
| Column 17, line 35, | "gaseoous" should be -- gaseous --. |

Signed and sealed this 8th day of June 1971.

(SEAL)
Attest:

EDWARD M. FLETCHER, JR.
Attesting Officer

WILLIAM E. SCHUYLER, JR.
Commissioner of Patents